US006907319B2

(12) United States Patent
Hoelscher et al.

(10) Patent No.: US 6,907,319 B2
(45) Date of Patent: Jun. 14, 2005

(54) SYSTEM FOR THE APPLICATION OF PESTICIDES

(75) Inventors: Ingo Hoelscher, Basel (CH); Karl Gutbrod, Basel (CH)

(73) Assignee: Syngenta Crop Protection, Inc., Greensboro, NC (US)

(*) Notice: Subject to any disclaimer, the term of this patent is extended or adjusted under 35 U.S.C. 154(b) by 119 days.

(21) Appl. No.: 10/399,200

(22) PCT Filed: Oct. 12, 2001

(86) PCT No.: PCT/EP01/11845

§ 371 (c)(1), (2), (4) Date: Apr. 11, 2003

(87) PCT Pub. No.: WO02/32222

PCT Pub. Date: Apr. 25, 2002

(65) Prior Publication Data

US 2004/0034459 A1 Feb. 19, 2004

(30) Foreign Application Priority Data

Oct. 14, 2000 (EP) ........................................... 00122493

(51) Int. Cl.[7] .................................................. G05D 9/00

(52) U.S. Cl. ......................... 700/283; 239/156; 701/50; 111/7.2

(58) Field of Search ................................ 700/283–285, 700/265, 90; 239/156, 166, 172; 47/58.1 SC, 58.1 LS, 1.7; 701/50; 111/118, 7.2, 200; 222/160, 1, 58

(56) References Cited

U.S. PATENT DOCUMENTS 5,044,756 A 9/1991 Gaultney et al. ........... 356/446
5,222,324 A 6/1993 O'Neall et al. ............... 47/1.7
5,296,702 A 3/1994 Beck et al. ................. 250/226
5,355,815 A 10/1994 Monson ...................... 111/200
5,389,781 A 2/1995 Beck et al. ................. 250/226
5,585,626 A 12/1996 Beck et al. .............. 250/222.1
5,758,766 A 6/1998 Aeby et al. ................. 206/216
5,763,873 A 6/1998 Beck et al. ............. 250/214 B
5,789,741 A 8/1998 Kinter et al. ............... 250/226
5,793,035 A 8/1998 Beck et al. .............. 250/222.1
5,809,440 A 9/1998 Beck et al. ................... 701/50
5,833,144 A 11/1998 Kinter ........................ 237/462
5,837,997 A 11/1998 Beck et al. ............ 250/227.11
5,870,689 A * 2/1999 Hale et al. ..................... 702/5
5,927,603 A * 7/1999 McNabb ...................... 239/63
5,979,703 A 11/1999 Nystrom ...................... 222/58
6,000,577 A 12/1999 Nystrom ........................ 222/1
6,062,496 A 5/2000 Kinter ........................ 239/462
6,070,539 A 6/2000 Flamme et al. ............. 111/177
6,199,000 B1 * 3/2001 Keller et al. .................. 701/50
6,266,595 B1 * 7/2001 Greatline et al. ............. 701/50
6,596,996 B1 7/2003 Stone et al. ............. 250/241.8
6,601,341 B2 8/2003 Raun et al. .................. 47/58.1
6,702,200 B2 3/2004 Solie et al. ................. 239/172
2003/0019152 A1 1/2003 Raun et al. ............ 47/58.1 SC
2003/0091657 A1 * 5/2003 Chiasson .................... 424/725
2004/0065834 A1 4/2004 Stone et al. ............. 258/341.8

FOREIGN PATENT DOCUMENTS

WO 94/02812 2/1994
WO 96/02817 2/1996
WO 97/37372 10/1997
WO 99 17245 A 4/1999
WO 99 17606 A 4/1999
WO 03/009669 2/2003
WO 03/009682 2/2003

OTHER PUBLICATIONS

"Crop Protection Association Proposals: Summary of Responses", Nov. 8, 2000, Department for Environment, Food & Rural Affairs.*

Casady et al., "Calibrating Granular Pesticide Applicators", Feb. 1997, University of Missouri Extension.*

Beard et al., "Boom Sprayer Calibration for Pesticide Applications", Feb. 1999, Utah State University Extension.*

"The Precision Farming Primer", 1999, Precision Farming Primer.*

* cited by examiner

*Primary Examiner*—Leo Picard
*Assistant Examiner*—Chad Rapp
(74) *Attorney, Agent, or Firm*—Thomas Hamilton

(57) ABSTRACT

A system for the variable rate application of pesticides is provides, comprising a) a vehicle capable of traversing an agricultural production area; b) at least one sensor for attachment to said vehicle for direct sensing plant and/or condition data on said agricultural production area, said sensor being capable of transmitting said directly sensed data to computing means; c) computing means for processing the data output of said sensor; d) at least one tank mounted on or attached to said vehicle carrying pesticidal formulations; e) pesticide delivery means mounted on or attached to said vehicle capable of receiving delivery instructions from said computing means and of delivering pesticides from said tank in compliance with said instructions; characterized in that f) said computing means is capable of reading and processing data from a computer-readable medium having stored thereon a plurality of data, said plurality of data including data relating to the functional relationship between the amounts of individual pesticides and the biological effects achievable with said amounts on the plants or their environment, optionally under consideration of the soil conditions and climatic conditions.

12 Claims, No Drawings

SYSTEM FOR THE APPLICATION OF PESTICIDES

BACKGROUND OF THE INVENTION

The present invention relates to a system for the variable rate application of pesticides, to a method for the variable rate application of pesticides, to a computer-readable medium, to a pesticide packaging system and to a process for ordering pesticides.

Computer-controlled product application systems for agricultural use are generally known. An apparatus for ascertaining a current fertilizer content of a soil scene in real-time, and then determining a chemical prescription and dispensing fertilizer on the land without the need for a navigation system or digital fertilizer maps is described, for example, in U.S. Pat. No. 5,355,815.

U.S. Pat. No. 5,222,324 describes a crop spraying system adapted for attachment to an implement frame pulled by a tractor which employs a spray nozzle for each crop row in combination with a photo detector arrangement for sensing the presence of weeds extending above the crop height. Following detection of a weed in a crop row, a controller momentarily turns on a spray nozzle covering that row after a selected time interval depending upon traction vehicle speed and detector-spray nozzle spacing for applying a herbicide to the detected weed.

U.S. Pat. No. 6,000,577 relates to a method of measuring and reporting a product application rate for a mobile product applicator having at least one speed sensor device and further having at least one product storage device including at least one load cell operatively connected thereto; wherein the application rate data for selected products is determined by a data processor via algorithmically defined interrelationships between previously stored discrete speed sensor data, load cell data, time interval data, product density data, and spreading path data.

WO 99/17606 describes an apparatus for the detection, management and treatment of vegetation, comprising a plurality of optical sensors with optical filters such that vegatation may be classified, and comprising a computer with a memory storing a database and a procedure for controlling the discharge of a treatment agent from a treatment assembly in dependence on characteristics of the classes of vegetation stored in the database wherein the discharge of the treatment agents can depend on characteristics of treatment agents.

However, the prior art variable rate application systems are not capable of taking into account the functional dependency of the application rate of the pesticide in relation to the biological effect achievable with and depending on said application rate.

Said functional dependency is highly specific for each individual pesticide and is a function of various parameters, e.g. the past, actual or future weather (temperature, precipitation, humidity, sunlight), plant variety, plant stress, soil condition and type, status of the stomata of the plant, emergence state of the plant, infection status, application time, activity level of the pesticide, mixture effects with other pesticides (synergies) or formulation types.

As an example for the temperature-dependency of a pesticide, Proceedings, North Central *Weed Control Conference.* 1985, Vol. 40, 118 describes glyphosate activity in potato under different temperature regimes and light levels. Under cool temperatures. (13° C. day/4° C. night), phytotoxicity of glyphosate/ha was 50% less than at 24° C./13° C. The effect of temperature on broccoli response to the preemergence application of oxyfluorfen is described in Weed Technology, 1999, Vol 13, pages 726 to 730. As mentioned in Weed-Research-Oxford. 1990, 30: 4, 261–269; 21 ref., the performance of thiameturon-methyl is markedly improved with increasing temperature and humidity. Increasing of rain reduces the activity of thiameturon-methyl.

Agrokhimiya, 1990, No. 7, 100–106; 13 ref. describes that the maximum acceptable level of phytotoxic quantities of atrazine, picloram and terbacil is a function of soil temperature, moisture and soil type. Increasing the soil temperature increased herbicide activity and reduced the maximum phytotoxicity threshold of picloram 1.5-fold, terbacil 2.5-fold and atrazine 3-fold. Increasing soil moisture also enhanced herbicide activity. An even more noticeable effect than that of the hydrothermal regime was exerted by soil type, the maximum phytotoxicity threshold being consistently lower for red earth than for chestnut soil.

Further, the adherance to the minimum and maximum dosage is more critical for pesticides than e.g. for fertilizers. Using dosages of a pesticide below the minimal effective amount on only one part of the field area for example may allow an uncontrolled propagation and/or development of resistent species of the insects or fungi which would result in a total loss of the harvest from the complete area around the treated field. Less critical is a too low fertilizer dosage which merely reduces the yield from the field on which the fertilizer has been directly applied.

Therefore, it is the object of the present invention to provide a system for the variable rate application of pesticides, which considers the dependency of the biological activity of each individual pesticide from its application rate, optionally under consideration of the climatic and/or soil conditions at the agricultural production area.

DETAILED DESCRIPTION OF THE INVENTION

The present invention therefore provides a system for the variable rate application of pesticides, comprising a) a vehicle capable of traversing an agricultural production area;

b) at least one sensor for attachment to said vehicle for direct sensing plant and/or condition data on said agricultural production area, said sensor being capable of transmitting said directly sensed data to computing means;

c) computing means for processing the data output of said sensor;

d) at least one tank mounted on or attached to said vehicle carrying pesticidal formulations;

e) pesticide delivery means mounted on or attached to said vehicle capable of receiving delivery instructions from said computing means and of delivering pesticides from said tank in compliance with said instructions;

characterized in that f) said computing means is capable of reading and processing data from a computer-readable medium having stored thereon a plurality of data, said plurality of data including data relating to a standardized functional relationship between the amounts of individual pesticides and the biological effects achievable with said amounts on said plants or their environment, optionally under consideration of the soil conditions and/or climatic conditions.

The system according to the present invention has two major benefits:

1) It reduces the relative cost of producing the crop in that area by improving the efficiency of the input product (pesticide, growth regulator, adjuvant) which results in e.g. higher yield, better product quality and better operational effiency (e.g. harvest speed).

2) It reduces the risk of environmental pollution from pesticides applied at levels greater than those required by the crop. The benefits from this efficiency will be both economical and environmental. The reduction of soil and groundwater pollution from farming activities has a desirable benefit to the farmer and to the society.

The different parts of the system according to the present invention are known per se and in general commercially available.

Examples of vehicles capable of traversing an agricultural production area are tractors or airplanes, preferably tractors, as described, for example, in U.S. Pat. No. 6,000,577 and U.S. Pat. No. 5,050,771. If the vehicle is ground based, it can be self-propelled or equipped for towing. Advantageously, said vehicle is equipped with a speed sensor. The sensors can be attached to the vehicle at any place, e.g. on top, bottom, in front or at back of the vehicle, dependent from the individual function of the sensor.

Suitable sensors for the system according to the present invention are in particular a) optical sensors, e.g. sensors detecting fluorescence from sunlit plants based on spectral line discrimination using the A-band and B-band absorption of atmospheric oxygen as described in U.S. Pat. No. 5,567,947; an example of a sensor detecting the near infra-red region of the electromagnetic spectrum is described in WO 99/30133; further light reflectance sensors measuring the chlorophyll content in the plant are available from Hydro Agri Deutschland GmbH, Hannighof 35, D-48249 Dülmen, Germany; (the chlorophyll in the plant leaf reflects green light while absorbing most of the blue and red lightwaves emitted from the sun. Stressed plants reflect various wavelengths of light that are different from healthy plants. Healthy plants reflect more infrared energy from the spongy mesophyll plant leaf tissue than stressed plants);

b) devices for sensing the organic matter content of soil as described in U.S. Pat. No. 5,044,756, U.S. Pat. No. 5,033,397 and U.S. Pat. No. 5,673,637 and available, for example, from CROP TECHNOLOGY, Inc. Houston, Tex., USA;

c) multispectral radiometers as available, for example, from CROPSCAN, Inc. 1932 Viola Heights Lane NE, Rochester, Minn. 55906, USA;

d) moisture sensors as available, for example, from Micro-Trak Systems, Inc., 111 E. LeRay Avenue, Eagle Lake, Minn. 56024; USA e) speed sensors as available, for example, from Micro-Trak Systems, Inc., 111 E. LeRay Avenue, Eagle Lake, Minn. 56024; USA The system according to the present invention can be equipped with one single sensor (e.g. light reflectance sensor) or with a plurality of sensors (e.g. combination of light reflectance sensor, moisture sensor and temperature sensor).

Suitable computing means for processing the data output of said sensors are commonly known and commercially available, for example from AG LEADER TECHNOLOGY, PO Box 2348, Ames, Iowa 50010-2348, USA (e.g. PF3000 Precision Farming System); DICKEY-JOHN, PO Box 10, Auburn, Ill. 62615-0010 (e.g. Land Manager® and Land Manager II® application control systems); AMAZONEN-Werke H.Dreyer GmbH & Co. KG-49202 Hasbergen/Germany (e.g. Amatron® IIA).

Computer-readable media according to the present invention are e.g. diskettes or, preferably, chip-cards, i.e. cards that contain integrated circuits or chips which give the cards the ability to store and/or process and/or send data. Chip cards suitable for the computing means according to the present invention can be memory-cards, which contain storage but no processing or significant security capabilities or smart-cards, which contain a processor, systems software, application software and permanent data engraved into non-volatile memory, and volatile memory for use as a working storage area. Chip cards and reading devices are available, for example, from Micro-Trak Systems, Inc., 111 E. LeRay Avenue, Eagle Lake, Minn. 56024; USA; SANKYO SEIKI (AMERICA), INC., 4800 Great America Parkway, Suite 201, Santa Clara, Calif. 95054, USA; or ITT INDUSTRIES, CANNON, 8081 Wallace Road, Eden Praire, Minn. 55344, USA. Software for programming the chip cards is available, for example, from MICROSOFT CORPORATION, USA (Microsoft® Windows® for Smart Cards).

The programming of said functional relationship can be performed using development environments provided e.g. by the chip manufacturer.

A standardized functional relationship according to the present invention is the dependency of the application rate of the pesticide in relation to the biological effect achievable with said application rate under standardized conditions. Such standardized conditions can include conditions of a healthy plant, (defined chlorophyll content, no infection) defined plant growth status, specific temperature and humidity or standard soil.

The computing means according to the system of the present invention a) correlates the data received from said sensor (e.g. moisture sensor) with default data from said computer-readable medium having stored thereon a standardized functional relationship (e.g. moisture dependency of the pesticidal activity of a herbicide) and b) sends the so calculated pesticide application rates as delivery instructions to pesticide delivery means mounted on or attached to said vehicle.

Tank mounted on or attached to said vehicle carrying pesticidal formulations and pesticide delivery means are available, e.g. from AG-CHEM Equipment Co., Inc., 5720 Smetana Drive, Minnetonka Minn., USA. A combination of tanks with pesticide delivery means and a pesticide delivery management system is described in U.S. Pat. No. 5,979,703. The system according to the present invention is especially suitable for the use of a direct injection sprayer, which is a conventional crop sprayer fitted with an injection pump system which dispenses pesticides at a given rate into the sprayer water pipe line. The vehicle can carry a) a plurality of relatively small pesticide containers each of them equipped with an injection pump system and b) a single large water tank. On the move of the vehicle, the computing means can deliver instructions to each injection pump individually allowing convenient switch of the pesticide. Further, different active ingredients (e.g. two pesticides, a pesticide and a safener, a fertilizer and a pesticide, etc.) can be combined straight before the application to one composition. This method is especially advantageous if such ingredients are chemically not compatible in one single formulation.

The system according to the present invention is useful for the application of any pesticide like fungicides, herbicides, growth regulators, insecticides, safeners or mixtures thereof. Suitable pesticides are described, for example, in The Pesticide Manual, eleventh ed., British Crop Protection Council, 1997. Preferred pesticides for the use with the system according to the present invention are e.g. selected from the group comprising Prosulfuron, Pyridate, Pyriftalid, S-Metolachlor, Simazine, Terbuthylazine, Terbutryn, Triasulfuron, Trifloxysulfuron, Trinexapac-ethyl, Ametryn, Atrazine, Benoxacor, Butafenacil, Chlortoluron, Cinosulfuron, Clodinafop, Cloquintocet, Desmetryn, Dicamba, Dimethachlor, Dimethametryn, DTPA NaFe, EDDHA NaFe, Fenclorim, Flumetralin, Fluometuron, Fluthiacetmethyl, Halosulfuron, Isoproturon, Metobromuron, Metolachlor, S-Metolachlor, Norflurazon, Oxasulfuron, Piperophos, Pretilachlor, Primisulfuron, Prometryn, Propaquizafop, Acibenzolar-S-methyl, Chlorothalonil, Cyproconazole, Cyprodinil, Difenoconazole, Fenpropidin, Fenpropimorph, Furalaxyl, Metalaxyl, Metalaxyl-M, Oxadixyl, Penconazole, Propiconazole, Pyrifenox, Thiabendazol, Abamectin, Bromopropylate, Cypermethrin, Cypermethrin High-Cis, Cyromazine, Diafenthiuron, Diazinon, Dichlorvos, Disulfoton, Emamectinbenzoate, Fenoxycarb, Formothion, Furathiocarb, Lufenuron, Methidathion, Permethrine, Codlemone, Phosphamidon, Profenofos, Pymetrozine, Quinalphos, Thiamethoxam, Thiocyclam, Thiometon and Trifloxystrobin.

Soil conditions according to the present invention are, for example, moisture content, temperature, pH-value, organic matter content, penetrability or fertibility. Climatic conditions are, for example, temperature, humidity (of the plants or their environment), radiation or wind. Plant data can be the chlorophyll content of the plant, the growth, the canopy properties or stress (draught, temperature influence, nutrients, pests, diseases, damage). A preferred directly sensed plant data is the chlorophyll content of the plant.

Information relating to soil conditions and climatic conditions can be previously stored on said computer-readable medium before the application of the pesticide or can be directly sensed on the move of said vehicle with a suitable sensor as mentioned above. In a preferred embodiment of the present invention the soil conditions and/or climatic conditions are directly sensed.

As mentioned above, the efficiency of pesticides under wet conditions varies to a considerable extent and is very compound-specific: Some pesticides show a wash-off effect under wet conditions, i.e. the applied pesticide remains not long enough on the plant surface in order to achieve the desired biological effect. In contrast thereto, other pesticides increase their biological activity if the surface of the plants is wet. The formulation type (for example granulate, dry powder, aqueous solution, salt, flowable, oil flowable, emulsifiable concentrates or suspension concentrates) also influences the activity of the pesticide.

Equipped e.g. with a moisture sensor and computing means capable of reading and processing a standardized dose-response curve of a specific pesticide from a computer-readable medium, said dose-response curve is a function of the moisture presence, the system according to the present invention is capable of adjusting the application rate of the pesticide immediately on the go if the moisture content of the agricultural production area changes, e.g. if it begins to rain during the application procedure or if the plant surface of one part of the agricultural production area is covered with dew and the other part of the production area is not. Situations like the presence of dew in the morning at the beginning of the application procedure and the dissapearance of dew in the afternoon of the same day at the end of the application procedure in view of sunlight an increasing temperature can also automatically be considered by the system according to the present invention.

In another embodiment of the present invention, the system according to the present invention, equipped with a temperature sensor and optionally with a humidity sensor, is able to consider during application of the pesticide (e.g. a herbicide) the status of the stomata of the plants which, in general, is temperature and humidity dependent. If the stomata are more open, the receptivity of the plant for the pesticide increases and therefore the application rate is automatically adjusted by the system to lower levels.

In a preferred embodiment of the present invention said functional relationship comprises a dose-response curve which is, in general, non-linear. Especially preferred, said functional relationship comprises a dose-response curve which contains data defining the minimum and maximum pesticidally effective dose relating to the treated plants or their environment.

In another preferred embodiment of the present invention the system considers light reflectancy (either single or combined wave lengths) to determine disease or pest incidence in the crop and set the product use and dosage as a function of that incidence.

Preferred climatic conditions at the location of said agricultural production area are the air temperature or the moisture content of the plant leaves, in particular the air temperature. A preferred sensed plant data is the chlorophyll content of the plant at the location of said agricultural production area.

Further systems according to the present invention are preferred, in which said functional relationship considers the soil properties of said agricultural production area. Information about soil properties can be made available for calculation to said computing means either by direct sensing with a soil sensor during movement of the vehicle, can be previously stored on said computer-readable medium or can be derived from soil maps provided by other computing means.

The knowledge of the soil properties is important if root uptake by the target plants is the major site of uptake for the pesticide (especially for a herbicide). In a soil with high clay or high organic matter content, the pesticide can be immobilized and therefore cannot reach the roots in sufficient amounts. Activity in the soil can also be influenced by soils which degrades the pesticides by chemical or microbial degradation or by leaching.

Further systems according to the present invention are preferred, wherein said functional relationship considers the elapsed time after the emergence of the culture crops.

Computing means for processing the data output of said sensor can be located on or attached to said vehicle. In another embodiment of the present invention, said computing means is located remote from said vehicle and the data output of said sensor is transferred for processing to said computing means by wire, GPS transmission or radiowave transmission. After processing of the data, said computing means send delivery instructions by wire, GPS transmission or radiowave transmission back to the pesticide delivery means located on said vehicle.

In a further preferred embodiment of the present invention said computing means is attached to said vehicle.

In an especially preferred embodiment of the present invention at least one sensor is a light reflectance sensor measuring the chlorophyll content in the plant.

In a further preferred embodiment the system according to the present invention comprises at least one sensor which is a moisture sensor measuring the moisture content of the soil or of the air.

In another especially preferred embodiment of the present invention the system is equipped with a sensor which detects the plant biomass (e.g. by measuring the chlorophyll content of the plants) and said computer-readable medium having stored thereon a plurality of data, said plurality of data including data relating to a standardized functional relationship between the amount of trinexapac-ethyl and the biological effects achievable with said amount on said plants or their environment as a function of the plant biomass, and optionally under consideration of the soil conditions and climatic conditions at the location of the agricultural production area.

Trinexapac-ethyl is a growth regulator and is described, for example as entry no. 744 in The Pesticide Manual, eleventh ed., British Crop Protection Council, 1997.

The present invention also relates to a method for the variable rate application of pesticides comprising the steps of a) directly sensing plant and/or condition data on an agricultural production area with at least one sensor attached to a vehicle capable of traversing said agricultural production area,
b) transmitting the directly sensed data from said sensor to computing means;
c) providing a computer-readable medium having stored thereon a plurality of data, said plurality of data including data relating to a standardized functional relationship between the amounts of individual pesticides and the biological effects achievable with said amounts on said plants or their environment, optionally under consideration of the soil conditions and climatic conditions at the agricultural production area,
d) calculating with said computing means pesticide application rates online during movement of said vehicle on or over the agricultural production area by correlating said directly sensed data with said plurality of data relating to said standardized functional relationship stored on said computer-readable medium,
d) sending the calculated pesticide application rates as delivery instructions from said computing means to pesticide delivery means mounted on or attached to said vehicle and capable of delivering pesticides from least one tank mounted on or attached to said vehicle; and
e) treating said agricultural production area with the calculated amount of the so delivered pesticides.

Another object of the present invention is a computer-readable medium having stored thereon a plurality of data, said plurality of data including data relating to a standardized functional relationship between the amounts of individual pesticides and the biological effects achievable with said amounts on said plants or their environment, optionally under consideration of the soil conditions and climatic conditions, which, when executed by computing means, cause said computing means to correlate said data with data obtained from at least one sensor as described above.

The computer-readable medium can be distributed to the customer separately from the order of the individual pesticide or together in one package with a corresponding pesticidal composition. For example, a specific dose-response curve of said pesticidal composition, which curve considers the dependency of said pesticidal composition from climatic and/or soil conditions, can be stored on said computer-readable medium and said computer-readable medium can be distributed together with the corresponding pesticide in one package.

Therefore, a further object of the present invention is a pesticide packaging system containing at least one specific pesticidal composition, characterized in that the packaging system contains at least one computer-readable medium having stored thereon a plurality of data, said plurality of data including data relating to a standardized functional relationship between the amounts of said specific pesticidal composition and the biological effects achievable with said amounts on said plants or their environment, optionally under consideration of the soil conditions and climatic conditions.

The pesticide packaging system is not limited to a specific kind of package and can therefore comprise any kind of package or container suitable for the safe transport of pesticides as described, for example, in U.S. Pat. No. 5,758,766 or WO 00/07885.

In order to meet the demands of the customer for personal tailoring of soil and crop management to match conditions at every location, the optimisation of pesticide distribution lines is very important. In general, pesticides are delivered with general instructions for their use which cannot consider satisfactorily the crop growth conditions on a specific agricultural production area. It is therefore highly desirable to provide the customer with a crop management solution which is specifically tailored to his demands and his location.

Therefore, another object of the present invention relates to a process for ordering pesticides, characterized by the steps of a) receiving instructions from the customer, preferably via internet, to deliver at least one pesticide;
b) delivering said pesticide to the customer; and
c) delivering to the customer via internet or, preferably, on a computer-readable medium data relating to a standardized functional relationship between the amount of said pesticide and the biological effects achievable with said amount on said plants or their environment, optionally under consideration of the soil and/or climatic conditions, said data being in a form which allows processing with said computing means as mentioned above.

The delivering of the pesticide can be performed from a different location as the delivering of the pesticide-specific data. For example, the pesticide can be delivered by the distributor and the data relating to a standardized functional relationship between the amount of said pesticide and the biological effects achievable with said amount said the plants or their environment can be delivered by the manufacturer.

The presently claimed process for ordering pesticides enables the provider of the pesticide to design individual solutions for the application of pesticides on demand of the customer for a defined agricultural production area in which e.g. soil properties and climatic conditions are very specific, pesticide persistence problems from previous applications exists or specific government regulations have to be considered. Further, existing systems according to the present invention and software relating to said system can be updated in a convenient manner via electronic transmission of the data if e.g. product properties (concentration, formulation) have to be adjusted.

The presently claimed process for ordering pesticides enables the provider of the pesticide to design individual solutions for the application of pesticides on demand of the customer for a defined agricultural production area in which e.g. soil properties and climatic conditions are very specific, pesticide persistence problems from previous applications exists or specific government regulations have to be considered. Furthermore, existing systems according to the present invention and software relating to said system can be updated in a convenient manner via electronic transmission of the data if e.g. product properties (concentration, formulation) have to be adjusted.

What is claimed is:

1. A system for a variable rate application of pesticides, comprising a) a vehicle capable of traversing an agricultural production area;

b) at least one sensor for attachment to said vehicle for direct sensing plant and/or condition data on said agricultural production area, said sensor being capable of transmitting said directly sensed data to computing means;

c) computing means for processing data output of said sensor;

d) at least one tank mounted on or attached to said vehicle carrying pesticidal formuations;

e) pesticide delivery means mounted on or attached to said vehicle capable of receiving delivery instructions from said computing means and of delivering pesticides from said tank in compliance with said instructions;

characterized in that f) said computing means is capable of reading and processing data from a computer readable medium having stored thereon a plurality or data, said plurality of data including data relating to a standardized functional relationship between the amounts of individual pesticides and the biological effects achievable with said amounts on said plants or their environment, wherein said functional relationship comprises a dose-response curve.

2. A system according to claim 1, characterized in that said functional relationship considers soil conditions and/or climatic conditions.

3. A system according to claim 2, characterized in that at least one parameter selected from soil conditions and climatic conditions is directly sensed.

4. A system according to claim 1, characterized in that said dose-response curve contains data defining the minimum and maximum pesticidally effective dose relating to the treated plants or their environment.

5. A system according to claim 2, characterized in that said climatic condition is the air temperature at the location of said agricultural production area.

6. A system according to claim 2, characterized in that said climatic condition is the moisture content of plant leaves at location of said agricultural production area.

7. A system according to claim 1, characterized in that said functional relationship considers the elapsed time after the emergence of culture crops.

8. A system according to claim 1, characterized in that said computing means is attached to said vehicle.

9. A system according to claim 1, characterized in that said at least one sensor is a light reflectance sensor measuring the chlorophyll content in the plant.

10. A system according to claim 1, characterized in that said at least one sensor is a moisture sensor measuring the moisture content of the soil.

11. A computer-readable medium having stored thereon a plurality of data, said plurality of data including data relating to the functional relationship between the amounts of individual pesticides and the biological effects achievable with said amounts on the plants or their environment which, when executed by computing means, cause said computing means to correlate said data with data obtained from at least one sensor according to the system of claim 1.

12. Computer-readable medium according to claim 11, characterized in that said functional relationship considers the soil conditions and climatic conditions.

* * * * *